Sept. 12, 1961  A. L. FISHPAW ET AL  2,999,355
CONTROL APPARATUS FOR AIRCRAFT HAVING THRUST REVERSING MEANS
Filed Dec. 3, 1957  7 Sheets-Sheet 1

FIG. I

*INVENTORS*
ARTHUR L. FISHPAW and
GILBERT P. McAVOY

BY *Julian C. Renfro*
ATTORNEY

Sept. 12, 1961   A. L. FISHPAW ET AL   2,999,355
CONTROL APPARATUS FOR AIRCRAFT HAVING THRUST REVERSING MEANS
Filed Dec. 3, 1957   7 Sheets-Sheet 2

INVENTORS
ARTHUR L. FISHPAW and
GILBERT P. McAVOY
BY *Julian C. Renfro*
ATTORNEY INVENTORS
ARTHUR L. FISHPAW and
GILBERT P. McAVOY
BY
ATTORNEY Sept. 12, 1961 A. L. FISHPAW ET AL 2,999,355
CONTROL APPARATUS FOR AIRCRAFT HAVING THRUST REVERSING MEANS
Filed Dec. 3, 1957 7 Sheets-Sheet 5

INVENTORS
ARTHUR L. FISHPAW and
GILBERT P. McAVOY
BY Julian C. Renfro
ATTORNEY

Sept. 12, 1961  A. L. FISHPAW ET AL  2,999,355
CONTROL APPARATUS FOR AIRCRAFT HAVING THRUST REVERSING MEANS
Filed Dec. 3, 1957  7 Sheets-Sheet 6

*INVENTORS*
ARTHUR L. FISHPAW and
GILBERT P. McAVOY

BY Julian C. Renfro
ATTORNEY

Sept. 12, 1961 A. L. FISHPAW ET AL 2,999,355
CONTROL APPARATUS FOR AIRCRAFT HAVING THRUST REVERSING MEANS
Filed Dec. 3, 1957 7 Sheets-Sheet 7
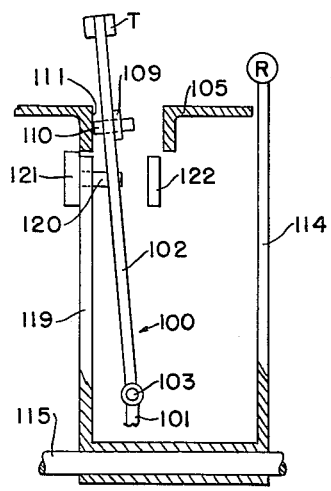
FIG. 12
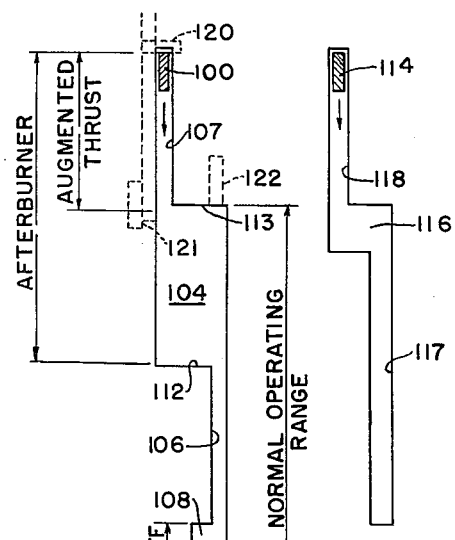
FIG. 13
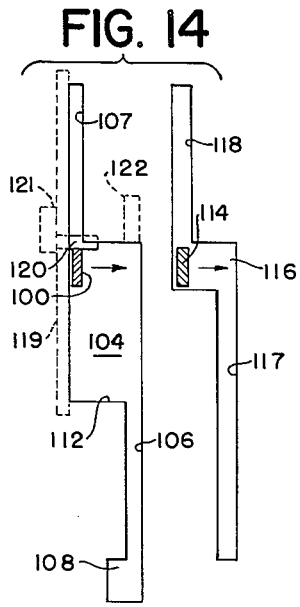
FIG. 14  FIG. 15  FIG. 16
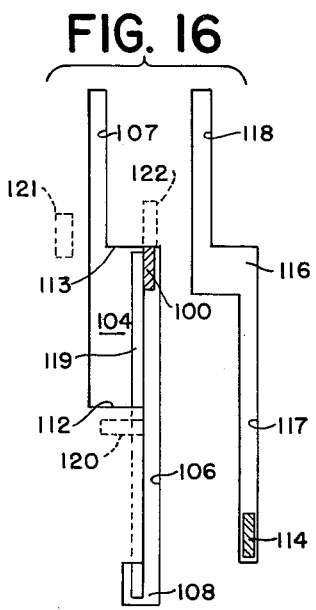
INVENTORS
ARTHUR L. FISHPAW and
GILBERT P. McAVOY
BY Julian C. Renfro
ATTORNEY

2,999,355
CONTROL APPARATUS FOR AIRCRAFT HAVING THRUST REVERSING MEANS

Arthur L. Fishpaw, Baltimore, Md., and Gilbert P. McAvoy, Winter Park, Fla., assignors to The Martin Company, Middle River, Md., a corporation of Maryland Filed Dec. 3, 1957, Ser. No. 700,374
13 Claims. (Cl. 60—35.54)

The present invention relates to control apparatus for aircraft, and more particularly to an improved control mechanism for aircraft having thrust reversing means, whereby engine thrust and thrust reversal may be controlled in an advantageous manner.

While it is contemplated that the new control device may be employed in aircraft of various types, it is particularly applicable for controlling jet powered aircraft having adjustable means for reversing the direction of engine thrust. In this respect, modern jet aircraft are frequently provided with suitable adjustable vanes or deflectors adapted controllably to be positioned in the flow path of the jet exhaust gases, for deflecting the gas flow and altering the direction of the effective engine thrust forces. Such reverser means are most usefully employed for braking the forward motion of the aircraft, as in landing or in-flight maneuvering.

One of the important features of the present invention resides in the provision of a novel combination control mechanism for controlling engine thrust and thrust reversal in an aircraft, whereby a desired correlation may be provided between the operation of the aircraft engine and thrust reverser means. At the same time, substantial independence of control is afforded, to permit effective handling of the aircraft at all times during normal flight.

A more specific, but highly important feature of the invention resides in the provision of a combination throttle and thrust reverser control which provides for immediate restoration of full forward engine thrust in the event of a wave-off from a landing approach, for example. The foregoing feature is of particular importance in connection with jet aircraft and, to this end, provision is made for automatically providing minimum engine thrust levels for various adjusted positions of the thrust reverser means. Thus, as the thrust reverser means is adjusted toward a "full" reverse position, the minimum thrust throttle position is advanced and, if the throttle control is not at the time at or beyond such minimum position, it is automatically advanced by operation of the reverser control means. When the reverser control is moved to a "full reverse" position, the minimum throttle setting will be at the maximum engine r.p.m. position, and in the event of a wave-off, for example, the thrust reverser means may be moved quickly to an ineffective position, and the full normal thrust of the engine is immediately available for forward acceleration.

Another specific feature of the invention resides in the provision of an improved combination throttle and thrust reverser control mechanism for jet aircraft having afterburner means. In accordance with this aspect of the invention, the new combination control is operative automatically to shut off the afterburner means prior to effecting thrust reversal, so that the thrust reverser vanes are not damaged by the direct action of the afterburner flame.

A further specific feature of the invention resides in the provision of an improved combination control mechanism of the type and having the characteristics set forth above, which permits of convenient manual manipulation of separate throttle and thrust reverser control levers and which is advantageously suited for the control of multi-engine aircraft. In this respect, the new control is arranged in a compact and unitary manner, with the control levers in accessible positions, and with a desirable mechanical interaction between the throttle and thrust reverser control levers, whereby easy and accurate manipulation of a plurality of levers is facilitated.

Other specific aspects of the invention reside in particular mechanical features thereof, as will be more fully described in the following detailed specification and the accompanying drawings, in which.

Figure 5:
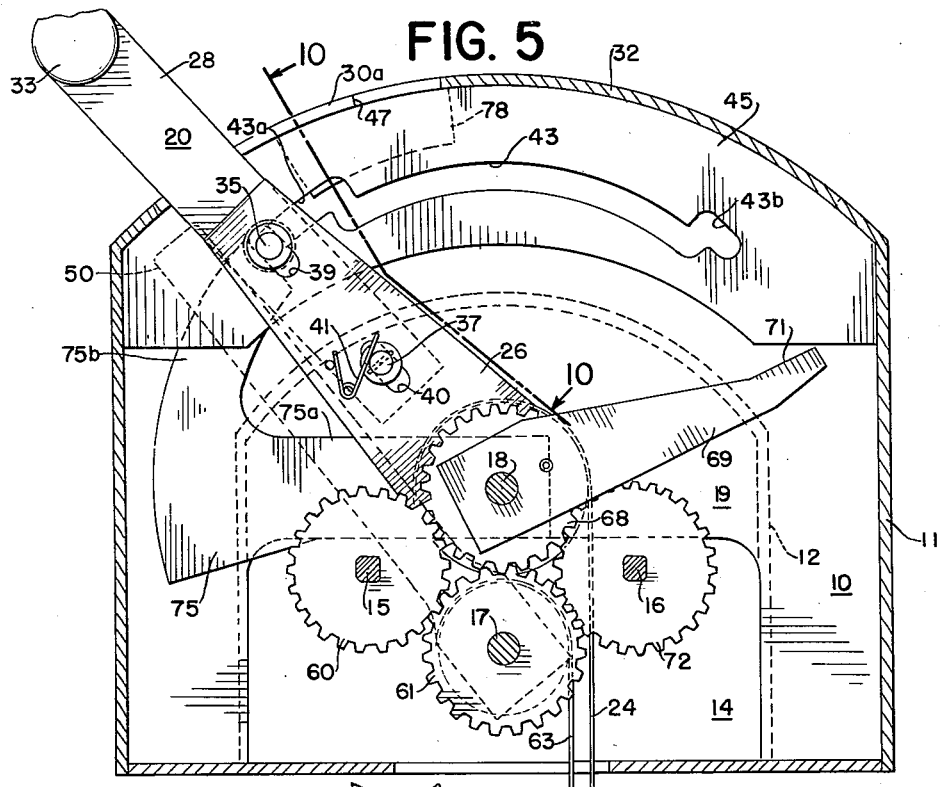
FIG. 5 is a transverse cross sectional view taken generally on line 5—5 of FIG. 4.
Figure 6:
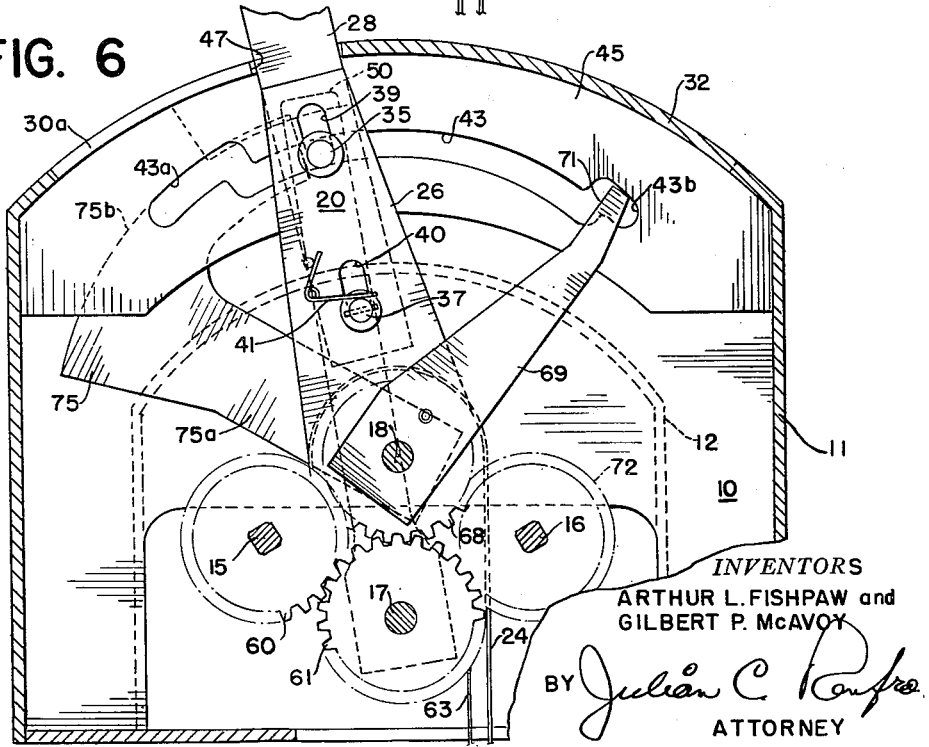
Figure 7:
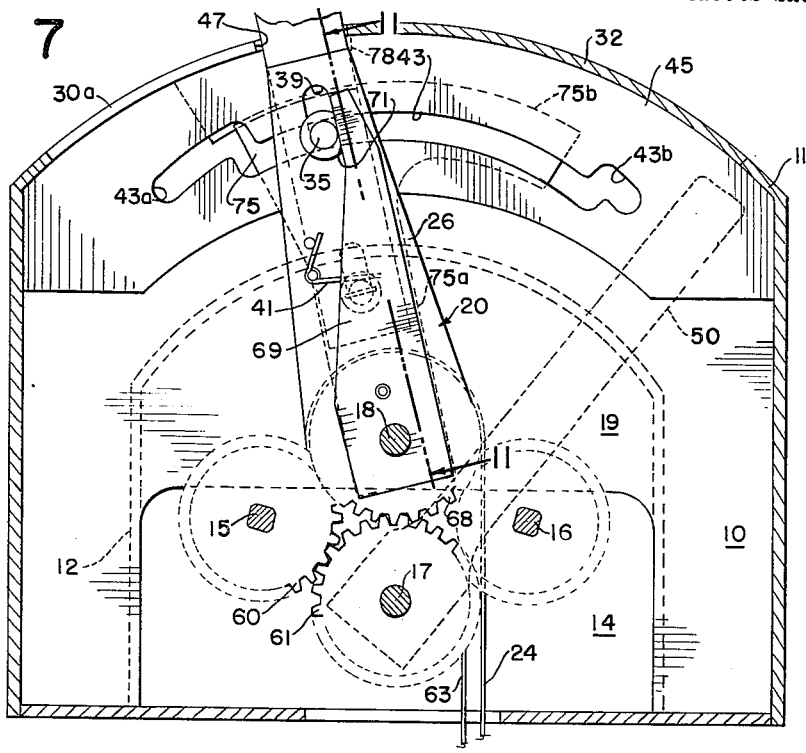
Figure 8:
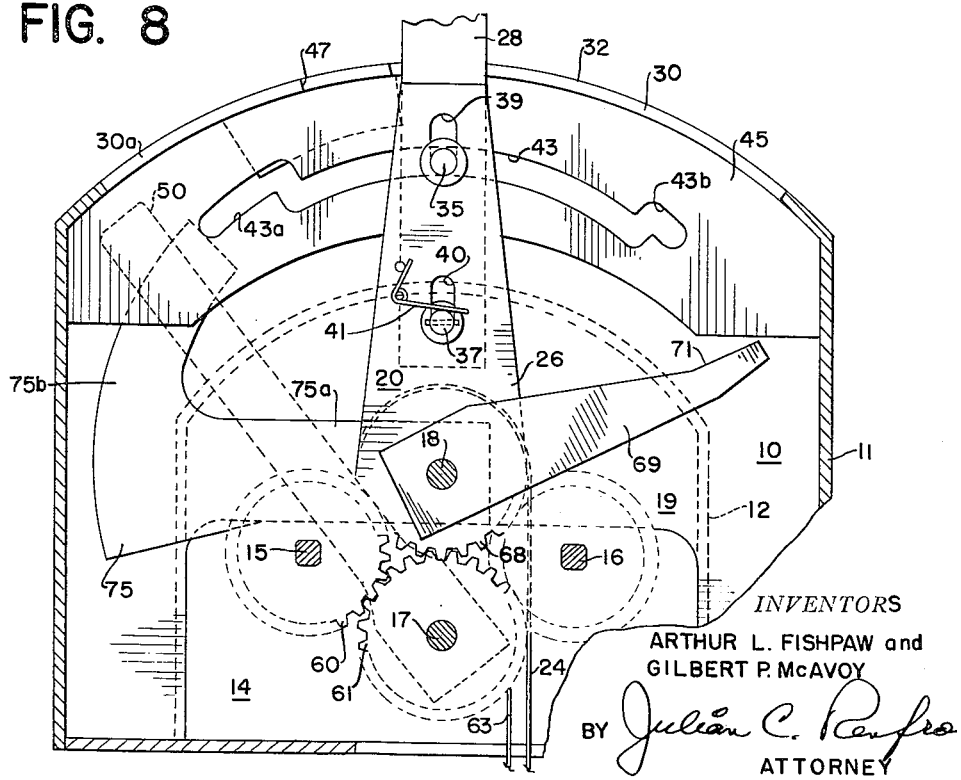
Figure 10:
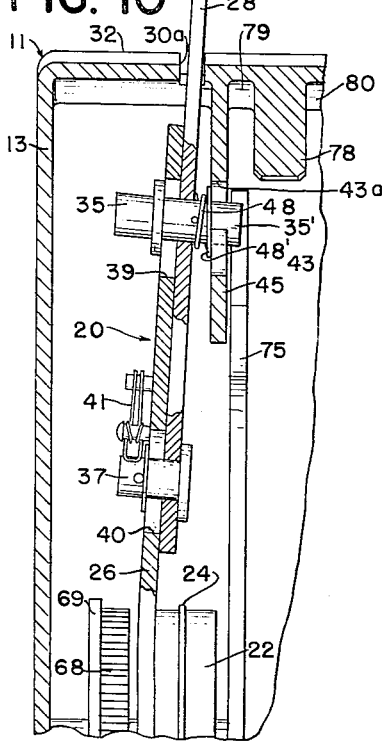
Figure 11:
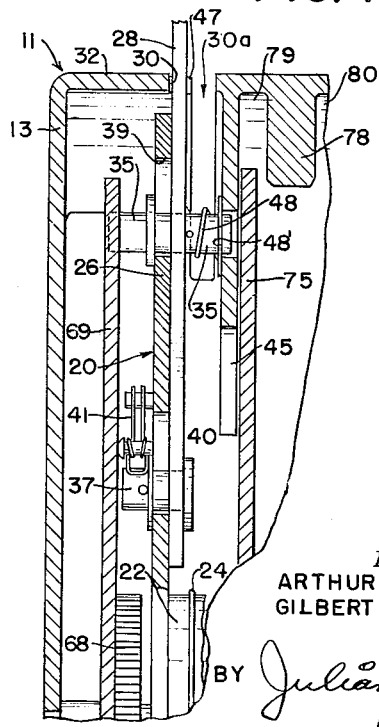

FIGS. 6–9, inclusive, are cross sectional views similar to FIG. 5, with the control mechanism set in various different positions;

FIG. 10 is a fragmentary cross sectional view taken generally on line 10—10 of FIG. 5;

FIG. 11 is a cross sectional view similar to FIG. 10, with the control mechanism in a different position;

FIG. 12 is a fragmentary, cross sectional view, in simplified form, of a modified form of the new control apparatus; and FIGS. 13–16 are simplified representations of the modified apparatus, showing a sequence of operations thereof.

Figure 1:
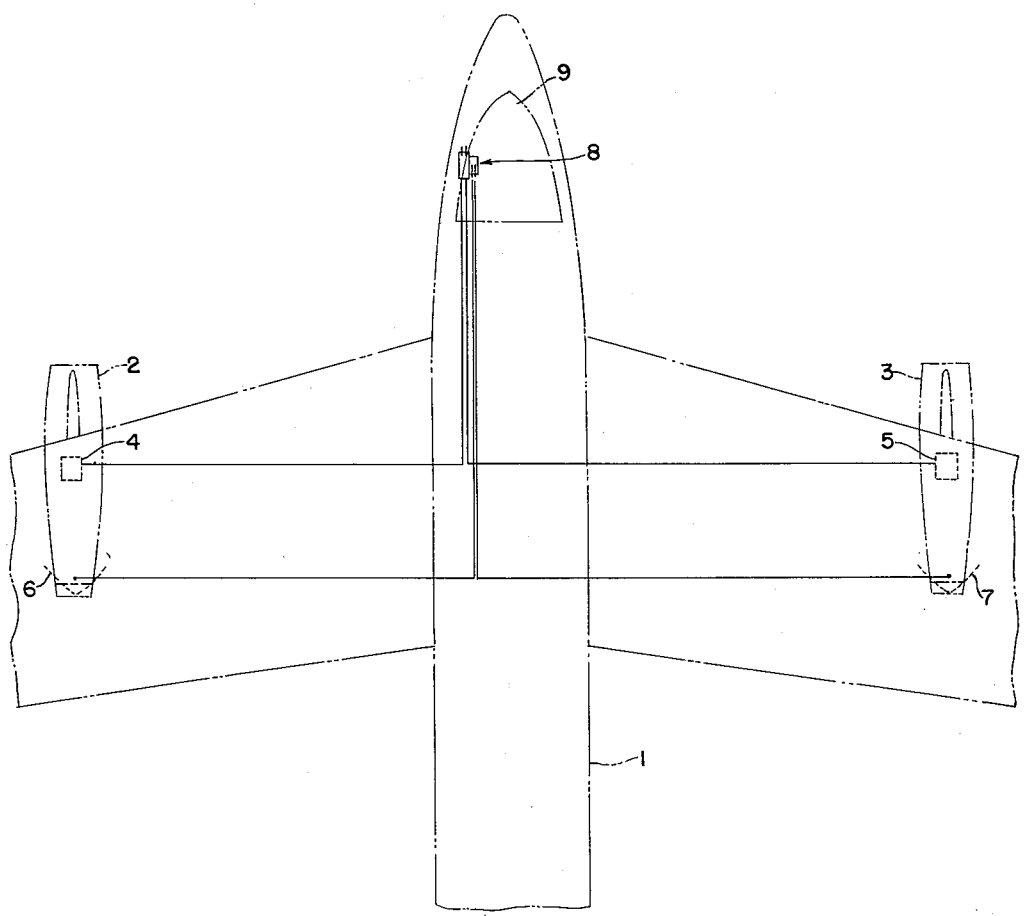
FIG. 1 is a simplified schematic representation of a jet aircraft incorporating the control apparatus of the invention.

Referring now to the drawing, and initially to FIG. 1 thereof, the reference numeral 1 designates a jet aircraft having a pair of jet engines 2, 3. The engines 2, 3, which may be of conventional construction, are provided with throttle means 4, 5 and thrust reverser means 6, 7. The thrust reverser means may be of any suitable construction and, by way of example only, a representative reverser arrangement is illustrated in U.S. Patent No. 2,620,622. In accordance with the invention, the aircraft 1 is provided with a novel combination control mechanism, indicated generally at 8 in FIG. 1, which is located in the control cockpit 9 of the aircraft, whereby the throttle and reverser means of the engines 2, 3 may be operated in an advantageous manner.

Referring now to FIGS. 2–5, the new control mechanism includes a housing 10 comprising a large housing part 11 and a smaller housing part 12. On the opposite end walls 13, 14 of the housing 10 are suitable bearings for rotatably mounting spaced, parallel shafts 15, 16. Also mounted on the walls 13, 14 and extending therebetween, is a third shaft 17, which is parallel to and generally below and between the shafts 15, 16. The shaft 17 may be non-rotatable. A fourth shaft 18, which also may be non-rotatable, is mounted by and extends between end wall 13 and an intermediate wall 19 of the housing 10.

For convenience of reference, the rotatable shafts 15, 16 respectively, may be referred to as connecting shafts. Shaft 17 may be referred to as the reverser shaft. And shaft 18 may be referred to as the throttle shaft.

Pivotally mounted on the throttle shaft 18 are spaced throttle lever assemblies 20, 21, to be described in greater detail, which carry at their lower ends cable drums 22, 23. The drums 22, 23 are attached to control cables 24, 25, in a conventional manner, whereby upon pivotal movement of the throttle levers 20, 21 the throttle mechanism 4 or 5 of one of the aircraft engines 2 or 3 is operated. The illustrated control mechanism is advantageously adapted for controlling two engines and, of course, the throttle levers 20, 21 may be independently manipulated to afford independent control of the engines.

In the illustrated form of the invention, each of the throttle levers comprises a lower arm 26, 27 connected to the throttle shaft 18, and an upper arm 28, 29 connected to the lower arm and projecting upwardly through an appropriate slot 30, 31 provided in upper wall 32 of the housing 10. Each lever has a knob 33, 34 at its upper extremity to facilitate manual manipulation.

Figure 4:
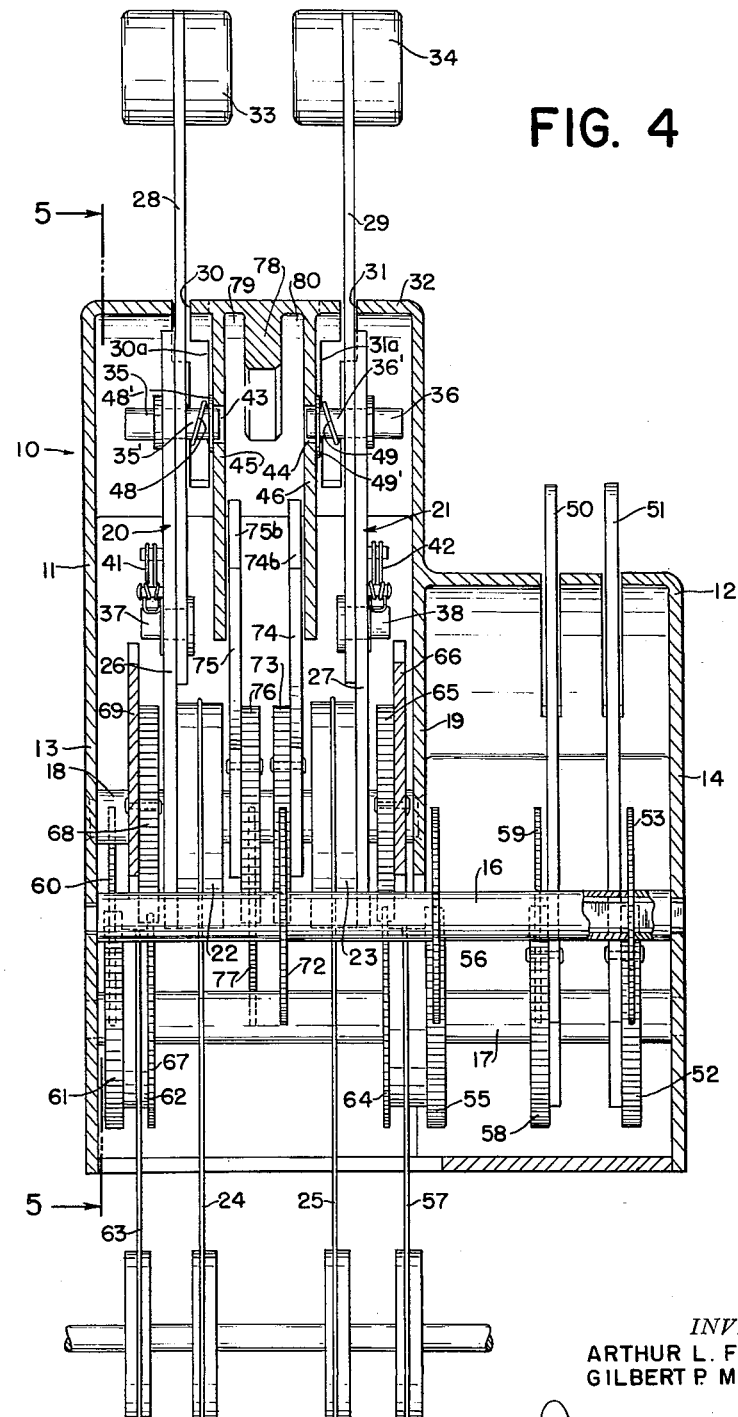
FIG. 4 is a longitudinal cross sectional view of the control device of FIG. 2.

As shown more clearly in FIGS. 4 and 5, for example, the upper arms 28, 29 of the throttle levers are connected to lower arms 26, 27 by pins 35, 36 and 37, 38 carried by the upper arms 28, 29 and received in elongated slots 39, 40. The arrangement is such that pivotal movement of the upper arms 28, 29 will effect corresponding movement of the lower arms 26, 27, while limited radial movement of the upper arms may be effected independently of the lower arms. Suitable springs 41, 42 are carried by the lower arms 26, 27 and bear radially inward upon pins 37, 38 to urge the upper arms in a radially inward direction.

As shown in FIG. 4, the upper pins 35, 36, which may be referred to as control pins, have inwardly projecting portions 35', 36' which are received in arcuate guide slots 43, 44 provided in depending walls 45, 46 of the housing 10. At the ends of the slots 43, 44 are portions such as 43a, 43b which are offset radially outward from the main or central portions of the slots.

When the throttle levers 20, 21 are manipulated throughout their normal ranges of movement the control pins 35, 36 travel in the central portions of slots 43, 44. However, in order to move either throttle lever to an extreme position, the upper arm portion thereof must be moved radially outward to draw its control pin 35 or 36 into the offset portion of its guide slot. Thus, with reference to FIG. 5, the right hand end 43b of guide slot 43 corresponds to an "off" position of the throttle lever 20, and to move the throttle to such position the upper arm portion 28 thereof must first be raised, after which the lever may be moved in a clockwise direction into an extreme position. In the illustrated control device, which is intended primarily for jet aircraft, the extreme forward or counterclockwise position of a throttle control lever constitutes an "augmented thrust" position. In order to move a throttle lever to this position, the lever is moved counterclockwise to the end of the main slot portion, at which point the upper arm must be raised to permit further counterclockwise of movement into the augmented thrust range.

Figure 2:
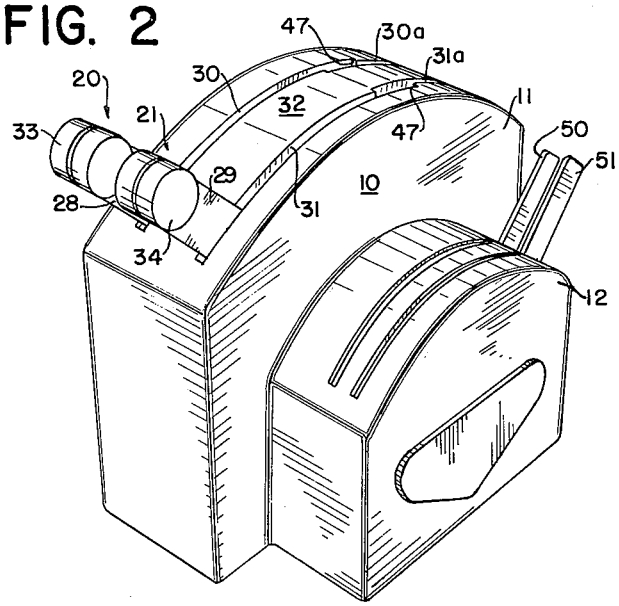
FIG. 2 is a perspective view of a combination control device used in the system of FIG. 1 and incorporating the features of the invention.

As will be discussed in greater detail, the upper arm portions 28, 29 of the throttle levers travel in elongated slots 30, 31 provided in the upper wall of the control housing 10, the forward ends of the slots 30, 31 being provided with inwardly offset portions 30a, 31a, as shown in FIG. 2. The offset slot portions 30a, 31a are so located on the housing 10 as to correspond with the "afterburner" control range of the throttle levers 20, 21. Accordingly, when the throttle levers are advanced to positions corresponding to 100 percent engine r.p.m., the forward edges of the throttle levers engage shoulders 47 formed by the offset slot portions 30a, 31a. This prevents further advance of the throttle levers, in the absence of a conscious effort, on the part of the pilot or operator, to deflect the levers inwardly into alignment with the offset slot portions.

If it is desired to advance the throttle levers into the afterburner range the upper arms 28, 29 of the levers may be deflected, as shown in FIG. 10, against the action of springs 48, 49, which act between the arms 28, 29 and washers 48', 49' bearing on the housing walls 45, 46 adjacent to the respective arms. When the throttle levers are thus deflected, control pins 35, 36 project through the walls 45, 46, substantially as shown in FIG. 10, for reasons which will be subsequently described.

During the initial advancing movements of the throttle levers in the afterburner range, the control pins 35, 36 travel in the main portions of guide slots 43, 44. However, continued advance of the throttle levers to extreme forward positions, corresponding to "augmented thrust" positions requires that the lever arms 28, 29 be raised to align the control pins 35, 36 with the offset portions of slots 43, 44.

As the throttle levers are retracted from fully advanced positions, the control pins 35, 36 will automatically be drawn into alignment with the main portions of guide slots 43, 44 by the action of springs 41, 42. Likewise, upon continued retracting movement of the levers out of the afterburner range the upper arms 28, 29 are automatically aligned with the main portions of slots 30, 31 by the action springs 48, 49.

In accordance with the invention, the new control device incorporates thrust reverser levers 50, 51 each adapted to effect control of thrust reverser means associated with an engine controlled by one of the throttle levers 20, 21. The thrust reverser means, in itself, forms no part of the present invention and may comprise any suitable means, such as vanes adapted to be projected into the path of jet engine exhaust gases whereby to reverse the direction of flow of all or a part of such gases. The arrangement is such that a predetermined portion of the engine thrust is directed forwardly, so that engine power may be utilized to decelerate the aircraft.

Figure 3:
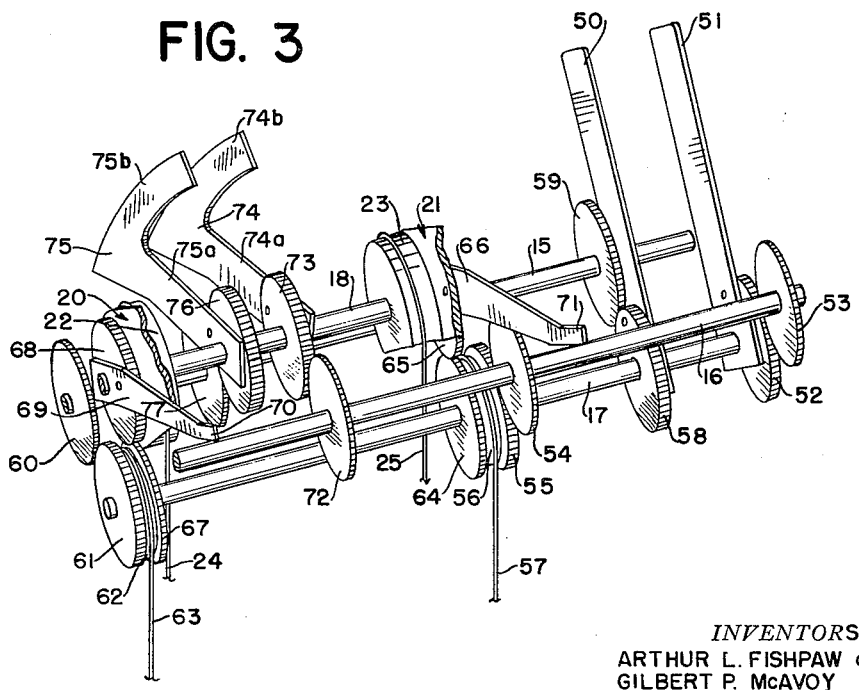
FIG. 3 is a perspective illustration of internal mechanism of the control device of FIG. 2.

As shown in FIG. 3, for example, the reverser lever 51, which is pivoted on reverser shaft 17, is connected to a pinion 52 driving a gear 53 fixed to the end of connecting shaft 16. The shaft 16 carries a gear 54, which meshes with a gear 55 driving a cable drum 56, whereby pivotal movement of the reverser lever 51 in a clockwise direction, looking from left to right in FIG. 3, effects clockwise rotation of the cable drum 56. A control cable 57 attached to the drum 56 operates the reverser means of one engine, through suitable servomechanisms or otherwise.

The second reverser lever 50, which is also pivoted on reverser shaft 17, is connected to a pinion 58 driving a gear 59 fixed to the end of connecting shaft 15. The opposite end of the shaft 15 carries a pinion 60 driving a gear 61, rotatably supported on the reverser shaft 17 and connected to a cable drum 62. A suitable control cable 63 is connected to the drum 62 and is adapted to be moved in response to movements of the reverser lever 50, substantially as described in connection with the lever 51 in cable drum 56.

In the illustrated form of the invention, the control device is adapted for controlling a pair of engines. Accordingly, the throttle control lever 20 and reverser lever 50 may be associated with one of the engines, while the throttle lever 21 and reverser lever 51 are associated with the other engine.

In accordance with the invention, novel arrangements are provided in the control mechanism for relating reverser and throttle control in a desired manner whereby proper control of aircraft engines may be effected with a minimum of attention on the part of the aircraft pilot and with a minimum opportunity for error in control manipulation. To this end, the cable drum 56 associated with reverser lever 51 has connected thereto a pinion 64 which drives a gear 65 rotatably supported on the throttle shaft 18. Secured to the gear 65 for movement therewith is a throttle advance arm 66 which projects radially from the throttle shaft 18, adjacent the throttle lever 21. Advantageously, the gear train connecting the throttle advance arm 66 and reverser control lever 51 is so arranged that retracting or clockwise movement of the lever 51 produces a corresponding advancing or counterclockwise movement of the throttle advance arm 66.

A second throttle advance arm 69 is operated by a train including pinion 67 secured to cable drum 62 and driving a gear 68, the latter being rotatably supported on throttle shaft 18. The gear 68 is connected directly to the second throttle advance arm 69. As shown in FIG. 3, the throttle advance arm 69 is similar to arm 66, the arm 69 being positioned adjacent throttle lever 20, however.

As best shown in FIGS. 3-9 the throttle advance arms 66, 69 (of which arm 69 only is shown in FIGS. 5-9) are provided with abutment surfaces 70, 71 at their outer ends, which are aligned in the paths of travel of control pins 35, 36. Accordingly, as the throttle advance arms 66, 69 move in advancing or counterclockwise directions, the abutment surfaces 70, 71 will eventually engage the outer end portions of control pins 35, 36, whereupon further advancing movements of the arms 66, 69 causes the throttle levers 20, 21 to move in an advancing direction. Retracting or clockwise movements of the throttle advance arms 66, 69 do not effect any movement of the throttle levers 20, 21 as will be readily understood.

Connected to the reverser lever 51, through shaft 16, pinion 72 and gear 73, is a cut-off arm 74, which is fixed to the gear 73 and arranged for rotation about the throttle shaft 18. The cut-off arm 74 has a radially extending portion 74a and an arcuate portion 74b spaced from the shaft 18 a distance approximately equal to the spacing between the shaft 18 and control pins 35, 36. As shown in FIG. 4, the cut-off arm 74 is so positioned axially on the throttle shaft 18 as to lie just inside the depending housing wall 46.

A second cut-off arm 75, having a radial portion 75a and an arcuate portion 75b, is mounted for pivotal movement on shaft 18 and is connected directly to a gear 76. The gear 76 is driven by a pinion 77 keyed to connecting shaft 15 and rotatable in accordance with movements of the thrust reverser lever 50. The cut-off arm 75 is positioned to lie just inside the depending housing wall 45 and is spaced a short distance from the cut-off arm 74 substantially as shown in FIG. 4.

As will be observed in FIG. 3 the gear trains interconnecting the cut-off arms 74, 75 with the respective reverser levers 51, 50 are such that retracting or clockwise movement of the reverser levers effects similar retracting movement of the cut-off arms.

In accordance with one aspect of the invention, when the throttle levers 20, 21 are advanced into the afterburner range, wherein the upper arm portions 28, 29 of the levers are in offset slot portions 30a, 31a, the control pins 35, 36 project through guide slots 43, 44 and beyond the inner surfaces of housing walls 45, 46. Accordingly, when the reverser levers 50, 51 are moved in a retracting direction, the cut-off arms 75, 74 move along the walls 45, 46, engage the projecting ends of control pins 35, 36 and carry the pins in a retracting direction. This causes the throttle levers 20, 21 to be moved in a retracting direction until the upper arms 28, 29 thereof are carried to the ends of offset slot portions 30a, 31a. At this point the arms 28, 29 move outwardly, under the action of springs 48, 49, so that the pins 35, 36 are retracted into the slots 43, 44. Further movement of the cut-off arms 75, 74 in a retracting direction is therefore without effect on the throttle levers 20, 21. The foregoing operations are depicted in FIGS. 5, 6, 7, 10 and 11.

In accordance with another specific aspect of the invention, when the reverser levers 50, 51 are in fully or partially retracted positions, wherein the thrust reverser means are fully or partially effective, it is desirable to preclude the intentional operation of the afterburner means, so that the reverser vanes are not damaged or destroyed by the high temperature afterburner flames. To this end, the housing 10 is provided with a depending abutment wall 78, which is positioned between walls 45, 46 and defines spaced recesses 79, 80 adapted to receive the arcuate outer portions 75a, 74a of the cut-off arms. Accordingly, after the initial movement of the reverser levers 50, 51 and cut-off arms 75, 74 has taken place and throttle levers 20, 21 have been moved out of their afterburner ranges, the cut-off arms will lie between the control pins 35, 36 and the abutment wall 78, substantially as shown in FIG. 11. With the cut-off arms 75, 74 in such positions, the control pins 35, 36 cannot be projected through the walls 45, 46 to an extent sufficient to permit the throttle lever arms 28, 29 to be aligned with the offset slot portions 30a, 31a.

In its contemplated operation, the control mechanism illustrated in FIGS. 1-11 will be incorporated in the control systems of a pair of jet engines. In normal flight the thrust reverser means of such engines are maintained inactive, and this is accomplished by moving the reverser control levers 50, 51 to fully advanced positions as shown in FIG. 2. Control of engine power is effected by manipulation of throttle levers 20, 21 in a more or less conventional manner, the engines being shut off when the throttles are fully retracted.

Advance of the throttles to the beginning of the offset slot portions 30a, 31a brings the engines to 100 percent r.p.m., and the range of movement between "off" position and "100 percent r.p.m." position is the normal operating range of the throttle levers. Additional thrust is obtainable by deflecting throttle levers 20, 21 inwardly into the offset slot portions 30a, 31a, to permit further advance of the throttle levers into afterburner ranges. And, in the illustrated control, augmented thrust (such as high energy fuel injection, water or alcohol injection, or other means for augmenting thrust over and above that obtained by afterburner operation) is obtainable by lifting the throttle arm portions 28, 29 to align the control pins 35, 36 with offset portions of guide slots 43, 44. It will be readily understood, of course, that the throttle levers 20, 21, as well as the reverser levers 50, 51, may be manipulated independently to effect independent control of the engines. However, in describing the operation of the control mechanism it will be assumed that the pairs of throttle and reverser levers are moved simultaneously since, as a general rule, the several engines of a multi-engine aircraft are controlled in unison.

When it is desired to effect a reversal of engine thrust, as when making a landing approach, for example, the levers 50, 51 are moved in a retracting direction to actuate the reverser means through an appropriate system, including cables 63, 57. During the initial retracting movement of the reverser levers 50, 51, the cut-off arms 75, 74 move clockwise along the depending housing walls 45, 46. If, at the time the reverser levers 50, 51 are retracted, the throttle levers 20, 21 are in the afterburner or augmented thrust positions, the cut-off arms will engage control pins 35, 36 and cause the throttle levers to be retracted to their 100 percent r.p.m. positions. If, on the other hand, the throttle levers are already in their normal operating ranges, the cut-off arms 75, 74 will sweep through their paths of movement without effect.

Figure 9:
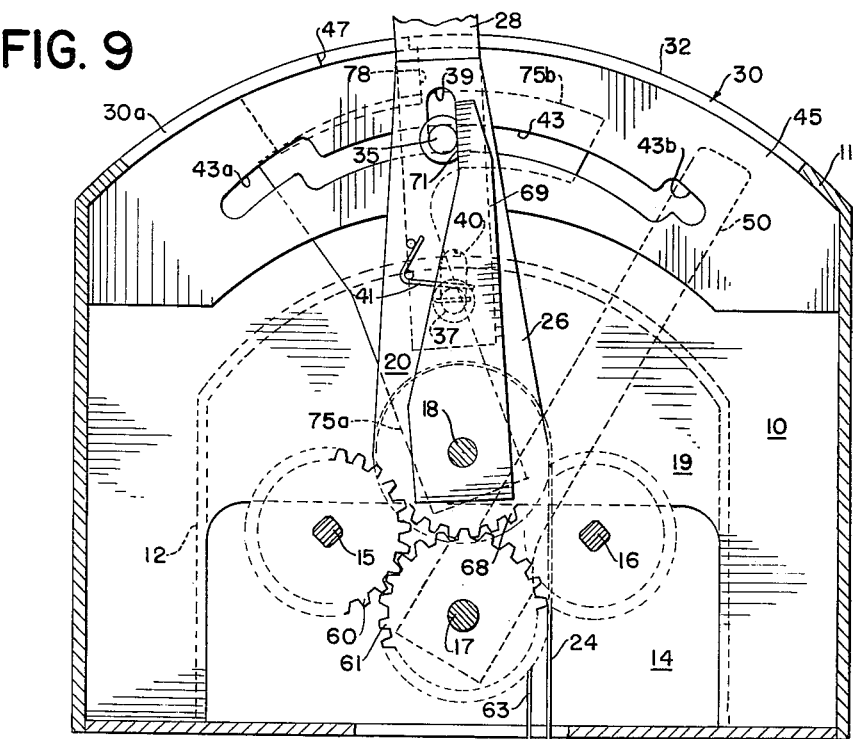

Continued retracting movement of the reverser control levers 50, 51 toward "full reverse" positions causes the throttle advance arms 66, 69 to move in an advancing or counterclockwise direction. Assuming that the throttle levers 20, 21 occupy an intermediate position in their normal operating ranges, substantially as shown in FIG. 9, the throttle advance arms 66, 69 will eventually be brought into contact with control pins 35, 36, whereupon further advancing movement of the arms 66, 69 will cause the throttle levers 20, 21 to be moved toward their 100 percent r.p.m. positions. Advantageously, the arrangement is such that retraction of reverser levers 50, 51 to full reverse positions will effect advancement of throttle levers 20, 21 to their 100 percent r.p.m. positions. Accordingly, as additional reversing thrust is applied by continued retracting movement of the reverser levers, engine power is correspondingly increased. This is an important and desirable feature since, in the event of a wave-off from the landing approach, for example, the reverser levers may be quickly advanced to their "off" positions, leaving the engines operating at full power. Heretofore, where a wave-off signal was given with the aircraft engine or engines operating at reduced power, a considerable time delay was involved in bringing the engine up to full power to clear the aircraft.

Assuming that an aircraft is safely landed with its thrust reverser means in operation, retraction of the throttle levers 20, 21 operates automatically to effect advancing movement of the reverser levers 50, 51 to their off positions. This is accomplished by means of the control pins 35, 36 which, upon retraction of the throttle levers, act upon the throttle advance arms 66, 69 to rotate gears 65, 68 and move the levers 50, 51 through the respective interconnecting gear trains.

In some instances, a jet engine may be adapted for afterburner operation over a range of engine r.p.m.'s, in which case the modified form of control illustrated in FIGS. 12–16 may be used to advantage. Except in the respects set forth below, the modified control is generally similar, in its construction and operation, to the control of FIGS. 1–11, so that many details of the modified control are omitted from the specification and drawing. The omitted details may readily be supplied by reference to the control of FIGS. 1–11.

Referring now to FIGS. 12–16, the numeral 100 designates generally a throttle lever assembly comprising a pivotally mounted lower section 101 and an upper section 102, which may be hinged to the lower section, as at 103. The upper section of the throttle lever 100 travels in a slot 104 in a control housing 105, the slot 104 having a predetermined irregular shape to accommodate lateral movement of the throttle lever, as well as movement of the lever lengthwise of the slot. The slot 104, shown in plan in FIG. 13, for example, comprises a pair of offset and partially overlapping longitudinal sections 106, 107, and an offset notch 108 at the end of longitudinal section 106. When the throttle lever is in the notch 108, the engine controlled by the lever is shut off. When the lever is in the back longitudinal section 106, the engine is running in its normal operating range, from idling speed to 100 percent r.p.m. When the lever is in the front longitudinal section 107 the afterburner is in operation; and when the lever is in the forward portion of the front section 107, thrust augmenting means are in operation, in addition to the afterburner.

During normal flight, the throttle lever may be adjusted lengthwise in the slot section 106, to set the engine at a desired r.p.m. level. Operation of the afterburner is effected by means of a switch 109 carried by the throttle lever and having a plunger 110 or the like adapted to be actuated when the throttle lever is moved laterally into alignment with the front slot section 107, an abutment wall 111 being provided in the housing 105 for engaging and actuating the plunger in the desired manner.

It is contemplated that the design of the engine will be such that afterburner operation may be initiated at a point below 100 percent engine r.p.m. and, to this end, the shoulder 112, defining the back end of the slot section 107, is located a substantial distance behind the front shoulder 113 of the slot section 106. By way of example only, the shoulder 112 may be so positioned that the throttle lever 100 is forwardly thereof at a throttle setting corresponding to 75 percent engine r.p.m. Accordingly, at any throttle setting in the example range of 75 percent to 100 percent engine r.p.m., the afterburner may be started by moving the throttle lever laterally, into alignment with the front slot section 107, to actuate the switch 109. Engine r.p.m. may then be adjusted, with the afterburner in operation, by moving the throttle lengthwise in the slot section 107.

Augmented thrust is obtained by moving the throttle lever 100 into the forward portion of the slot section 107, toward the position shown in FIG. 13. And, in this respect, the control apparatus may advantageously incorporate a safety interlock arrangement, such as used in the apparatus of FIGS. 1–11, so that a special manipulative operation of the throttle lever (such as lifting, for example) is required to enable the lever to be moved into the augmented thrust range.

In the modified control apparatus, a reverser lever 114 is mounted in the housing 105 for pivoting movement about the axis of a shaft 115 and for limited longitudinal movement along the shaft axis. The upper portion of the reverser lever 114 travels in a stepped slot 116 and is so arranged that movement of the lever from front to back (downward in FIGS. 13–16) in the back portion 117 of the slot effects operation of the aircraft thrust reverser vanes.

As explained heretofore, it is desirable, prior to actuation of the aircraft reverser means, to discontinue thrust augmentation and to turn off the afterburner. To this end, the reverser lever 114 has an associated mechanism which is operative, upon rearward movement of the lever in the forward section 118 of slot 116, to carry the throttle lever out of slot section 107, and, upon lateral movement into alignment with reverser slot section 117, to shift the throttle laterally to the right to shut off the afterburner. Thus, as shown in FIG. 12, a cut-off arm 119 is connected to the reverser lever 114, for movement therewith. The cut-off arm is located on the side of the throttle lever opposite the reverser lever and carries a cut-off pin 120 intermediate its forward and back edges.

In the arrangement of FIG. 13, for example, where the throttle and reverser levers 100, 114 are in their forwardmost positions, the position of the cut-off arm 119 is such that the pin 120 is adjacent the forward edge of the throttle lever. Accordingly, when the reverser lever 114 is drawn rearwardly, in preparation for effecting thrust reversal, the cut-off arm 119 and pin 120 move rearwardly, carrying the throttle lever along with them. When the reverser lever 114 has been moved to the back end of the slot section 118, the throttle lever 100 will have been moved out of the front portion of the slot section 107, into the position shown in FIG. 14, and at that control setting thrust augmentation will be discontinued, although the afterburner remains on and the engine operates at 100 percent r.p.m.

When the reverser lever is in the position shown in FIG. 14, the aircraft thrust reverser means remains inoperative, as the afterburner may still be in operation. Accordingly, to enable the reverser means to be brought into operation the reverser lever must first be shifted laterally to the right, into alignment with the slot section 117. The cut-off arm 119 shifts to the right along with the lever 114 and, in doing so, engages the throttle lever 100 and carries it to the right, substantially as shown in FIG. 15. With the control apparatus thus set, the afterburner is shut off and the engine is operating at 100 percent r.p.m., with the thrust reverser means inactive.

In accordance with one aspect of the invention, the rearward portion of the cut-off arm is sufficiently long, in a direction lengthwise of the slot 104, to extend throughout the entire area in which slot sections 106, 107 overlap, when the control setting is as shown in FIG. 15. This arrangement has a two-fold purpose: First, the cut-off arm functions as a guide for the throttle lever 100, so that the lever cannot be moved into afterburner position, accidentally or otherwise, as long as the reverser lever 114 remains in or aligned with the slot section 117; second, even though the throttle lever 100 is initially set in a position of less than 100 percent engine r.p.m., with the afterburner on, the cut-off arm 119 will engage the lever and move it out of its afterburner position.

When the control apparatus is conditioned as shown in FIG. 15, the aircraft thrust reverser means may be rendered effective by drawing the reverser lever 114 rearwardly in the slot section 117. The reverser means is rendered effective in proportion to the extent of rearward movement of the reverser lever and, when the lever is in its extreme rearward position, as indicated in FIG. 16, the reverser means is fully effective.

As shown in FIG. 16, the cut-off arm 119 has a portion extending forwardly from the pin 120 a distance such that, in all positions of the reverser lever 114, in the slot section 117, the cut-off arm prevents lateral movement of the throttle lever 100 to the left, to activate the afterburner means.

Since the reverser means are rendered effective by rearward movement of the lever 114, means are provided for disengaging (or preventing engagement between) the cut-off pin 120 and the throttle lever 100, so that the throttle lever is not moved rearwardly toward idling position. To this end, the housing 105 has a pair of pin positioning blocks or abutments 121, 122 located on opposite sides of the cut-off arm 119, adjacent the forward end of the slot section 106. The blocks 121, 122 limit the lateral movement of the cut-off pin 120, so that, as the cut-off arm is moved laterally from one limit position to the other, the pin 120 is caused to shift with respect to the cut-off arm 119. Thus, when the cut-off arm is shifted to the right (FIGS. 14, 15), the projecting end of the pin 120 engages the block 122 and is held thereby, while the cut-off arm continues to move, until it in turn is engaged by the block 122. This causes the pin 120 to be projected to the left from the cut-off arm, so that rearward movement of the arm may be accomplished without causing the throttle lever to be moved rearwardly.

When, at a subsequent time, the reverser lever 114 is shifted laterally to the left, the pin 120 engages the block 121 and is caused to project to the right from the cut-off arm, substantially as shown in FIG. 14.

Advantageously, the modified control apparatus includes throttle advance means (not specifically shown), which may be of the general type incorporated in the apparatus of FIGS. 1–11, for providing a minimum throttle lever setting for each setting of the reverser lever 114 along the path of the slot section 117. As the setting of the reverser lever moves toward a full reverse position, the minimum throttle setting is advanced toward 100 percent engine r.p.m. If the throttle lever is at or ahead of the minimum position the throttle advance means is without effect. If the throttle lever is behind the minimum position, however, it will be advanced automatically to the minimum position.

In general, the operation of the modified control of FIGS. 12–16 is the same as that of FIGS. 1–11, except that, in the modified control, the afterburner means may be activated over a range of engine r.p.m. levels. In addition, it will be understood that the modified control apparatus, like the apparatus of FIGS. 1–11, may advantageously be incorporated in a multi-engine control assembly.

One of the important advantageous features of the invention resides in the provision of a combination control mechanism correlating the power and reverser controls of an aircraft engine while at the same time affording sufficient independent control of engine thrust to permit the aircraft to be operated in the usual manner during normal flight. To this end, the engine throttle control may be operated independently of the reverser control during normal flight of the aircraft. At the same time, the reverser control is so interrelated with the throttle control as to provide minimum engine thrust levels for various adjusted positions of the thrust reverser means.

Another specific advantageous feature of the invention resides in the provision of a combination control mechanism for effecting correlated control of engine thrust and thrust reversal which is advantageously adapted for the control of multi-engine aircraft. In this respect, the new control mechanism is of a relatively simplified and highly compact nature, permitting the throttle control and thrust reversal levers to be positioned side by side and facilitating rapid and accurate manipulation of the levers. Moreover, the control mechanism is so arranged that the reverser levers are actuated in a direction opposite to the direction of throttle advance to avoid possible confusion under emergency conditions.

It should be understood that the specific control devices herein illustrated and described are intended to be representative only, as many changes may be made therein without departing from the clear teachings of the invention. Accordingly, reference should be made to the following appended claims in determining the full scope of the invention.

We claim:

1. A control mechanism for an aircraft having a jet engine and a thrust reverser means, comprising throttle control means movable through a range of positions from minimum power position to full power position, thrust reverser control means movable through a range of positions from minimum reverse position to full reverse position, and throttle advance means operated in accordance with operations of said thrust reverser control for setting minimum positions for said throttle control consistent with the position of said thrust reverser control in order to obtain sufficient thrust for effective operation of said thrust reverser means, and afterburner, and afterburner control means, in which cut-off means are operatively connected with said reverser control and are operative upon movement of said reverser control to actuate said afterburner control means to an "off" condition prior to actuation of the aircraft thrust reverser means.

2. The control mechanism of claim 1, in which blocking means are operatively connected with said reverser control for preventing actuation of said afterburner control means to an "on" condition when said reverser control is in a position for actuating the aircraft thrust reverser means.

3. A control mechanism for an aircraft having a jet engine and thrust reverser means, comprising a throttle lever mounted on a shaft for movement about the axis thereof, said throttle lever being adapted to control the power output of said jet engine, a reverser lever mounted on a shaft for pivotal movement about the axis thereof and adapted to control said thrust reverser means, said throttle and reverser levers being movable through predetermined operating ranges, and throttle advance means operatively connected with said reverser lever and adapted to coact with said throttle lever for moving said throttle into power-increasing positions as said reverser lever is moved into reversing positions, said throttle advance means comprising an arm mounted on a shaft for pivotal movement about the axis thereof and having a portion adapted to engage said throttle lever, said arm being driven by said reverser lever and being adapted, upon movement of said reverser lever in a reversing direction to a predetermined position, to engage said throttle lever in any position within a predetermined range and move it in a power-increasing direction to a position having predetermined relation to the position of said reverser lever, said arm and levers being so related that movement of said reverser lever to a full reverse position effects movement of said throttle lever from any intermediate power position to a full power position, an afterburner, and control means including said throttle lever for effecting operation of said afterburner, which includes an afterburner cut-off arm mounted on a shaft, said afterburner cut-off arm being driven by said reverser lever and being adapted, upon movement of said reverser lever in a reversing direction, to engage said throttle lever in any afterburner-operating position and to effect movement of said throttle lever out of afterburner-operating positions.

4. A control mechanism for an aircraft having a jet engine, thrust reverser means, and an afterburner, comprising a pivoted throttle lever for controlling engine power, a pivoted reverser lever for controlling reverser effectiveness, and means interconnecting said throttle and reverser levers and adapted upon operation of said reverser lever in one direction to move said throttle lever to a predetermined position corresponding to a pre-set position of said reverser lever, said predetermined position of said throttle lever being a position in which the power of said engine is maintained at a level sufficient to provide adequate braking effort during the application of said thrust reverser means, said throttle having a first range of positions from a minimum power position to a full power position and a second range of positions in which the afterburner operates, and afterburner cut-off means is drivingly connected to said reverser lever and operative, upon movement of said reverser lever toward a full reverse position when said throttle lever is in said second range, to move said throttle lever out of said second range.

5. The control mechanism of claim 4, in which said afterburner cut-off means is ineffective to move said throttle lever in said first range.

6. The control mechanism of claim 5, in which said afterburner cut-off means comprises a cut-off member having a portion engageable with said throttle lever, and means are provided for relatively displacing said throttle lever and cut-off member when said throttle lever is in said first range to prevent effective engagement of said throttle lever and said portion.

7. The control mechanism of claim 6, in which said throttle lever has a displaceable portion, guiding means are provided for said displaceable portion for retaining said displaceable portion in a first path when said throttle lever is in said first range and in a parallel but offset path when said throttle lever is in said second range, said displaceable portion being adapted for engagement with said cut-off member when said displaceable portion is in said offset path.

8. The control mechanism of claim 7, in which said cut-off means is operative, following movement of said reverser lever toward full reverse position, to prevent displacement of said displaceable portion into said offset path.

9. A control mechanism for an aircraft having a jet engine with an afterburner and thrust augmentation means, and thrust reverser means, comprising a pivoted throttle lever for controlling engine power, a pivoted reverser lever for controlling reverser effectiveness, and means interconnecting said throttle and reverser levers and adapted upon operation of said reverser lever in one direction to move said throttle lever to a predetermined position corresponding to a pre-set position of said reverser lever, said predetermined position of said throttle lever being a position in which the power of said engine is maintained at a level sufficient to provide adequate braking effort during the application of said thrust reverser means, said throttle lever having a first path of movement from a minimum power position to a full power and a second path of movement offset from said first path, said paths being overlapping in the area of said full power position, said throttle lever actuates said afterburner when moved into said second path and actuates said thrust augmentation means when moved into a non-overlapping portion of said second path, and cut-off means associated with said reverser lever and adapted upon movement thereof toward a reverse position to move said throttle lever out of said second path of movement.

10. The control mechanism of claim 9, in which the cut-off means comprises means for moving said throttle lever along said second path of movement and means for shifting said throttle lever laterally from said second path to said first path.

11. The control mechanism of claim 10, in which the means for moving the throttle lever comprises retractable means effective to engage said throttle lever in said second path of movement, and means for retracting the retractable means to prevent engagement thereof with said throttle lever in said first path of movement.

12. A control mechanism for a multi-engine aircraft having thrust reverser means associated with its engine comprising a housing, a first shaft disposed in said housing, a throttle lever for each engine mounted for pivotal movement on said shaft, each throttle lever extending through a respective elongated slot in said housing and having handle means thereon to be manually grasped, each throttle lever being movable along its slot for a substantial number of degrees of movement in order to control the speed of its respective engine, a throttle advance arm for each engine mounted for pivotal movement on said shaft and positioned axially adjacent a throttle lever, a second shaft disposed in said housing in spaced relation to said first shaft and substantially parallel thereto, a reverser lever for each engine mounted for pivotal movement on said second shaft, each reverser lever extending through a respective elongated slot in said housing and being movable through a substantial number of degrees of movement in order to control the amount of thrust reversing effect of each engine, gear means interconnecting said reverse levers with respective throttle advance arms for each engine, said throttle advance arms having means interengageable with said throttle levers, whereby upon movement of respective ones of said reverse levers toward full reverse positions, the respective throttle advance arms engage respective ones of said throttle levers and advance them toward full power positions, and throttle retarding levers disposed on said first shaft adjacent respective ones of said throttle levers for moving said throttle levers in the throttle retarding direction in the event said throttle levers are advanced too far along their respective elongated slots for the proper use of said reversing means.

13. In the combination of an aircraft having a jet engine, thrust reverser means and means for augmenting the normal power of the engine, a throttle control, and a reverser control, the improvement comprising a combined throttle and reverser control assembly having throttle and reverser levers mounted in side-by-side relation and pivotally movable about parallel axes, and throttle advance means in said assembly driven by said reverser lever and adapted to advance said throttle lever in predetermined relation to operations of said reverser lever, said control assembly including means interacting with said throttle lever for rendering said augmenting means effective, and means operatively connected with said reverser lever for rendering said augmenting means ineffective.

References Cited in the file of this patent

UNITED STATES PATENTS

| | | |
|---|---|---|
| 2,507,767 | Caster et al. | May 16, 1950 |
| 2,619,794 | Lombard | Dec. 2, 1952 |
| 2,620,622 | Lundberg | Dec. 9, 1952 |
| 2,658,334 | Marchant | Nov. 10, 1953 |
| 2,664,959 | Stuart | Jan. 5, 1954 |
| 2,720,751 | Kunz | Oct. 18, 1955 |
| 2,871,657 | Oates et al. | Feb. 3, 1959 |
| 2,932,164 | Watson | Apr. 12, 1960 |